(12) United States Patent
Thomas

(10) Patent No.: US 11,722,739 B2
(45) Date of Patent: Aug. 8, 2023

(54) NAVIGATING CONTENT BY RELEVANCE

(71) Applicant: DataShapes, Inc., Kentfield, CA (US)

(72) Inventor: Tyson J. Thomas, San Francisco, CA (US)

(73) Assignee: DataShapes, Inc., Kentfield, CA (US)

( * ) Notice: Subject to any disclaimer, the term of this patent is extended or adjusted under 35 U.S.C. 154(b) by 25 days.

(21) Appl. No.: 17/448,321

(22) Filed: Sep. 21, 2021

(65) Prior Publication Data

US 2023/0007354 A1 Jan. 5, 2023

Related U.S. Application Data

(60) Provisional application No. 63/203,005, filed on Jul. 2, 2021.

(51) Int. Cl.
*H04N 21/472* (2011.01)
*H04N 21/8405* (2011.01)

(52) U.S. Cl.
CPC ... *H04N 21/47217* (2013.01); *H04N 21/8405* (2013.01)

(58) Field of Classification Search
CPC ............ H04N 21/47217; H04N 21/8405
See application file for complete search history.

(56) References Cited

U.S. PATENT DOCUMENTS

| | | | |
|---|---|---|---|
| 8,437,606 B2 | 5/2013 | Chun et al. | |
| 10,095,367 B1* | 10/2018 | Berry | H04N 21/234363 |
| 2005/0120033 A1 | 6/2005 | Sezan et al. | |
| 2007/0154176 A1 | 7/2007 | Elcock et al. | |
| 2008/0092168 A1* | 4/2008 | Logan | H04N 21/6125 |
| | | | 725/44 |
| 2009/0067812 A1 | 3/2009 | Park | |
| 2014/0115621 A1 | 4/2014 | Karam | |
| 2018/0160189 A1* | 6/2018 | Engineer | H04N 21/8133 |
| 2019/0172166 A1 | 6/2019 | Evans | |
| 2021/0098026 A1* | 4/2021 | Bedi | G06V 10/462 |

FOREIGN PATENT DOCUMENTS

KR 20110038776 A 4/2011

OTHER PUBLICATIONS

International Search Report and Written Opinion dated Oct. 13, 2022, in PCT Application No. PCT/US2022/034811.
"Client Case Study: Fuse Media," Case Study, TrackIt, Dec. 2021, 6 pages.
"TrackIt AI Video Reviewer," Website, TrackIt, Downloaded: Feb. 9, 2022, URL: https://trackit.io/trackit_ai_video_reviewer/, 2 pages.

* cited by examiner

*Primary Examiner* — Nicholas T Corbo
(74) *Attorney, Agent, or Firm* — Weaver Austin Villeneuve & Sampson LLP

(57) ABSTRACT

Methods and apparatus are described that enable consumers of media content to identify and navigate to content of interest. A graphical user interface (GUI) is provided in association with media content in which entities (e.g., keywords or distinct speakers) represented in the media content are presented in relation to the media timeline of the media content.

15 Claims, 7 Drawing Sheets

["0"; {"5"; ["Joey Harrison", "Jeff Garcia", "Brett Favre", "Carson", "Garcia", "Big Ben", "Cincinnati", "Guilford", "Vikings", "Trenton", "Lions Garcia 1", "Joshua"], "10"; ["Arrington", "Joey Harrison", "Marcus Washington", "Alex Smith", "Santana Monson", "Jeff Garcia", "Brett Favre", "Carson", "Garcia", "Big Ben", "Redskins", "Guilford"], "15"; ["Arrington", "Joey Harrison", "Marcus Washington", "Alex Smith", "Stallworth", "Santana Monson", "Ernie Cogswell", "Jeff Garcia", "American Revolution Saints", "Brett Favre", "Carson", "Caldwell"] }, "1"; {"5"; ["Joey Harrison", "Jeff Garcia", "Brett Favre", "Carson", "Garcia", "Big Ben", "Guilford", "Vikings", "Trenton", "Lions Garcia 1", "Joshua", "Miller"], "10"; ["Arrington", "Joey Harrison", "Marcus Washington", "Alex Smith", "Santana Monson", "Jeff Garcia", "Brett Favre", "Carson", "Garcia", "Big Ben", "Redskins", "Guilford"], "15"; ["Arrington", "Joey Harrison", "Marcus Washington", "Alex Smith", "Stallworth", "Santana Monson", "Ernie Cogswell", "Jeff Garcia", "American Revolution Saints", "Brett Favre", "Carson", "Caldwell"] },...

*FIG. 5*

```
..."Niners": [0.0, 0.0, 0.0, 0.0, 0.0, 0.0, 0.0, 0.0, 0.0, 0.0, 0.0, 0.0, 0.0, 0.0, 0.0, 0.0,
0.0, 0.0, 1.0, 0.17171717171717171695, 0.0, 0.0, 0.0, 0.15151515151515151582,
0.38383838383838380054, 0.0, 0.0, 0.0, 0.0, 0.0, 0.0, 0.0, 0.0, 0.0,
0.0, 0.0, 0.0, 0.0, 0.0, 0.0, 0.0, 0.0, 0.0, 0.0, 0.0, 0.0, 0.0, 0.0,
0.0, 0.0, 0.0, 0.0, 0.0, 0.0, 0.0, 0.0, 0.0, 0.0, 0.0, 0.0, 0.0, 0.0,
0.0, 0.0, 0.0, 0.0]...
```

*FIG. 6*

NAVIGATING CONTENT BY RELEVANCE

INCORPORATION BY REFERENCE

An Application Data Sheet is filed concurrently with this specification as part of this application. Each application to which this application claims benefit or priority as identified in the concurrently filed Application Data Sheet is incorporated by reference herein in its entirety and for all purposes.

BACKGROUND

Consumers face an avalanche of audio and video media content with only keyword tags, screenshots, and hearsay to guide their searches and choices. Content providers have enormous archives of media content without efficient tools to index, mine, curate, and serve relevant material to their users.

Navigation of content during playback is driven by time rather than content, holding consumers hostage to linear playback and wasting their precious time and attention. For example, in listening to a sports podcast, how can a consumer only play the sections that talk about her favorite team and players? In an hour-long interview with a climate expert, how can a consumer find where the discussion relates to "ocean acidification?" In an educational video on machine learning, how can a consumer find and play only the sections relevant to "deep learning?" How can the consumer find other videos where these specific topics are mentioned? During the Q&A section of a panel discussion video, how can a consumer find if her questions were asked without watching the entire thing?

There are currently no simple, intuitive, and direct ways of finding, navigating to, and playing the relevant content of interest in a media presentation.

SUMMARY

According to a first class of implementations, devices, methods, and systems are provided by which a user interface may be presented on a display associated with a device. The user interface includes one or more elements configured for specifying portions of media content presented on the display. First input is received representing use of the one or more elements of the user interface to specify a first portion of the media content. A first set of entities is presented on the display. The first set of entities are represented in a first range of the media content corresponding to the first portion of the media content. Second input is received representing use of the one or more elements of the user interface to specify a second portion of the media content. A second set of entities is presented on the display. The second set of entities are represented in a second range of the media content corresponding to the second portion of the media content.

According to a specific implementation of the first class of implementations, the first set of entities includes one or more keywords included in the first range of the media content, one or more distinct speakers identified in the first range of the media content, or one or more visual objects identified in the first range of the media content.

According to a specific implementation of the first class of implementations, the one or more elements of the user interface are configured to specify the portions of the media content at multiple time scales. According to a more specific implementation, the one or more elements of the user interface include a slider element associated with a representation of a media timeline of the media content on the display. According to a still more specific implementation, a width of the slider element is adjusted to represent a corresponding one of the time scales. According to another more specific implementation, the first input represents placement of the slider element relative to the representation of the media timeline of the media content.

According to a specific implementation of the first class of implementations, the first and second sets of entities are identified using metadata associated with the media content. The metadata includes the first and second sets of entities and identifies corresponding ranges of the media content for each entity. According to a more specific implementation, the ranges of the media content associated with a first entity correspond to multiple time scales.

According to a specific implementation of the first class of implementations, the first portion of the media content corresponds to a first duration of the media content, and the first range of the media content overlaps with the first duration of the media content relative to a media timeline of the media content.

According to a specific implementation of the first class of implementations, a representation of a media timeline of the media content is presented on the display. Third input is received representing a first entity. One or more ranges of the media content in which the first entity is represented are identified. The representation of the media timeline is updated based on the one or more ranges in which the first entity is represented.

According to a second class of implementations, devices, methods, and systems are provided by which a representation of a media timeline of media content is presented on a display associated with the device. First input is received representing a first entity. One or more first ranges of the media content in which the first entity is represented are identified. The representation of the media timeline is updated based on the one or more first ranges to reflect one or more occurrences of the first entity relative to the media timeline of the media content.

According to a specific implementation of the second class of implementations, the first entity is a keyword included in the one or more first ranges, a distinct speaker identified in the one or more first ranges, or a visual object identified in the one or more first ranges.

According to a specific implementation of the second class of implementations, playback of the media content on the display is facilitated such that playback of the one or more first ranges is emphasized. According to a more specific implementation, playback of the media content is facilitated by skipping one or more second ranges of the media content in which the first entity is not represented.

According to a specific implementation of the second class of implementations, second input is received representing a second entity. One or more second ranges of the media content are identified in which the second entity is represented. The representation of the media timeline is updated based on the one or more second ranges to de-emphasize the one or more second ranges. According to a more specific implementation, playback of the media content is adapted by skipping playback of the one or more second ranges.

According to a specific implementation of the second class of implementations, the one or more first ranges of the media content in which the first entity is represented are identified using metadata associated with the media content.

The metadata includes a plurality of entities and, for each entity, corresponding ranges of the media content in which the entity is represented.

According to a specific implementation of the second class of implementations, the representation of the media timeline is updated by emphasizing an occurrence representation in the representation of the media timeline that corresponds to a plurality of occurrences of the first entity in the corresponding range of the media content.

According to a specific implementation of the second class of implementations, the first input is saved in connection with a user associated with the device. According to a more specific implementation, the saved first input is used in connection with a subsequent presentation of the media content, or in connection with presentation of different media content of a similar type. According to another more specific implementation, the saved first input is shared for use in connection with presentation of the media content or different media content of a similar type on one or more other devices.

According to a third class of implementations, devices, methods, and system are provided by which for each of a plurality of first ranges of media content, a first set of entities included in the corresponding first range of the media content is identified. For each of a plurality of second ranges of the media content, a second set of entities included in the corresponding second range of the media content is identified. Each of the second ranges of the media content encompass more of the media content than each of the first ranges of the media content. Metadata for use in presentation of the media content are provided. The metadata includes the first and second sets of entities and identifies the corresponding ranges of the media content for each entity.

According to a specific implementation of the third class of implementations, each of the first ranges of the media content is characterized by the same duration.

According to a specific implementation of the third class of implementations, each of the first ranges of the media content corresponds to a semantic unit.

According to a specific implementation of the third class of implementations, a first portion of the metadata identifies corresponding entities for each of the first and second ranges of the media content.

According to a specific implementation of the third class of implementations, a portion of the metadata identifies corresponding first ranges of the media content for each of the entities.

According to a specific implementation of the third class of implementations, input is received representing selection of one or more of the entities. New sets of entities are identified for the first and second ranges of the media content based on the input.

According to a specific implementation of the third class of implementations, input is received representing selection of one or more of the entities. The input is saved for use in connection with a subsequent presentation of the media content, or in connection with presentation of different media content of a similar type.

According to a specific implementation of the third class of implementations, input is received from a first client device representing selection of one or more of the entities. The input is transmitted to a second client device for use in connection with presentation of the media content, or in connection with presentation of different media content of a similar type.

According to a specific implementation of the third class of implementations, input is received from a first client device representing selection of one or more of the entities. Additional media content is identified based on the input. The additional media content or a recommendation for the additional media content is transmitted to the first client device.

A further understanding of the nature and advantages of various implementations may be realized by reference to the remaining portions of the specification and the drawings.

BRIEF DESCRIPTION OF THE DRAWINGS

FIG. 5 illustrates an example of metadata generated according to a particular implementation enabled by the present disclosure.

FIG. 6 illustrates another example of metadata generated according to a particular implementation enabled by the present disclosure.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

The present disclosure describes techniques that enable consumers of media content to identify and navigate to content of interest. According to a particular class of implementations, a graphical user interface (GUI) is provided in association with media content in which entities (e.g., keywords, distinct speakers, or visual objects) represented in the media content are presented in relation to the media timeline of the media content. For example, for a selected range of the media content a set of entities appearing in that range might be presented. In another example, the positions of occurrences of entities corresponding to a keyword selected or entered by a user might be presented relative to the media timeline. As will be appreciated, such GUI components allow the consumer to identify and navigate to the relevant portions of the media content. An example will be instructive.

Figure 1:
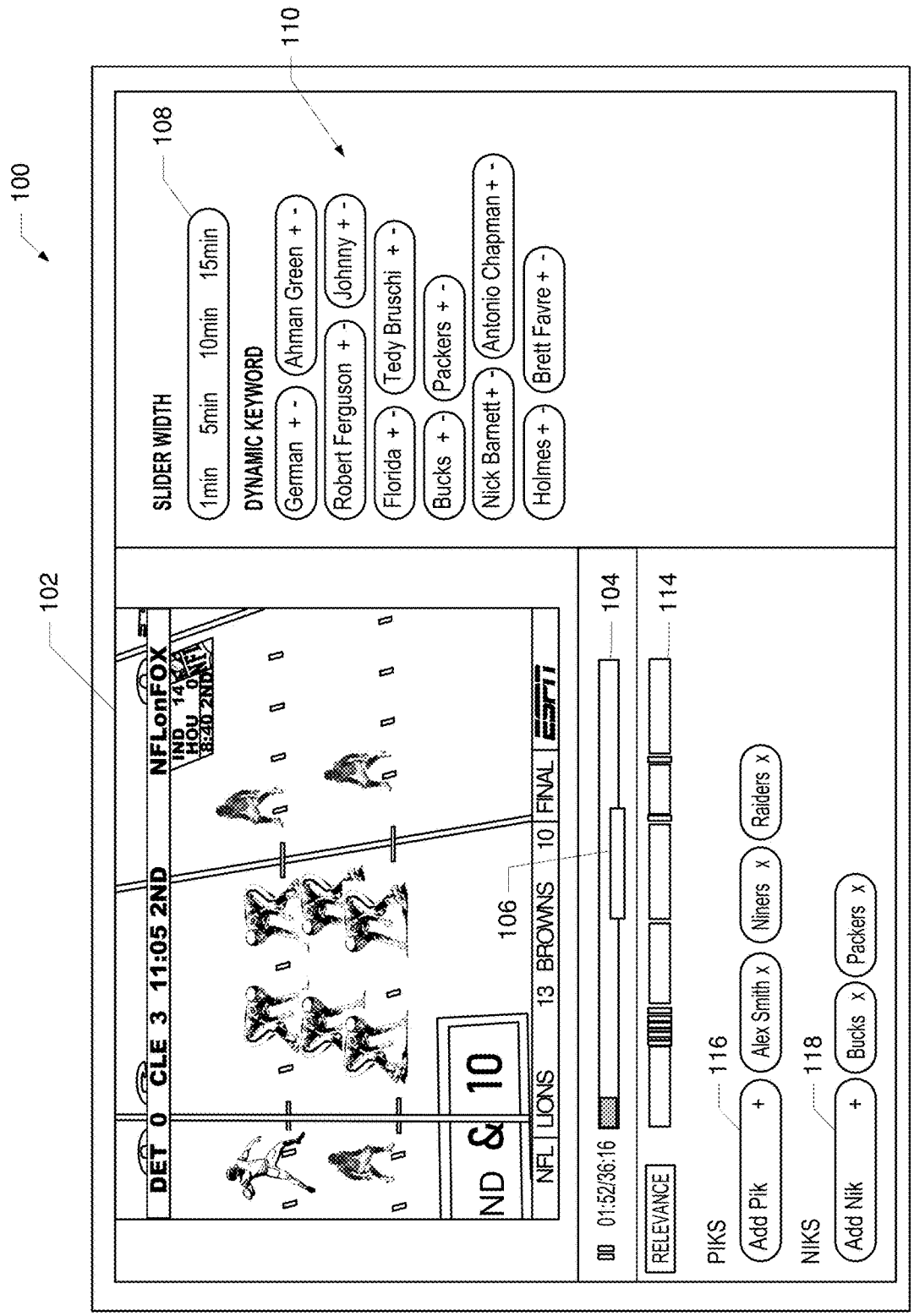
FIG. 1 depicts an example of a graphical user interface generated according to a specific implementation enabled by the present disclosure.

FIG. 1 depicts an example of a GUI 100 enabled by the present disclosure. GUI 100 includes a content window 102 in which video content is displayed. GUI 100 also includes a playback bar 104 that shows the current playback position relative to the media timeline of the video content (e.g., 1:52/36:16). An interactive slider component 106 is provided that can be moved by the consumer relative to playback bar 104. In the depicted example, the width of slider 106 may be selected by the consumer using slider width component 108 to be, in this example, one of four different time durations (e.g., one, five, ten, or fifteen minutes). The position of slider 106 relative to playback bar 104 selects a corresponding range of the video content.

Selection of a content range using slider 106 results in presentation of a set of relevant keywords represented in that range in dynamic keyword list 110. Thus, by positioning slider 106, a consumer can see what is being discussed in any given slice of the content. The consumer can quickly navigate to the content of interest by, for example, scrubbing along playback bar 104. As will be discussed, the manner in which keywords are identified, and their relevance determined may vary depending on the particular application. For example, in the depicted example of sports-related video content, the names of athletes and sports teams are emphasized.

GUI 100 also includes a relevance bar 114 in which occurrences of one or more specific keywords are represented relative to the same media timeline represented in playback bar 104. The specific keywords represented in relevance bar 114 may be selected from dynamic keyword list 110 (e.g., by selecting the "+" associated with each), or by entry of a keyword in positive interest keywords (PIKS) component 116. In the depicted implementation, the selected keywords are represented by lines in relevance bar 114. These lines can be presented with varying intensity depending, for example, on relevance and/or frequency. Again, scrubbing along playback bar 104 allows the consumer to navigate to the relevant ranges of the video content.

GUI 100 also allows for the identification of keywords in which the consumer does not have an interest; referred to herein as negative interest keywords (NIKS). Similar to PIKS, NIKS can be selected from dynamic keyword list 110 (e.g., by selecting the "−" associated with each), or by entry of a keyword in NIKS component 118. In the depicted example, NIKS are represented by gaps, dark lines, or otherwise de-emphasized lines in relevance bar 114. The consumer can then choose to skip playback of any such portions of the content.

As will be appreciated from the foregoing example, the mechanisms described enable a consumer to quickly identify and navigate to portions of media content relevant to the consumer's interest.

Figure 2:
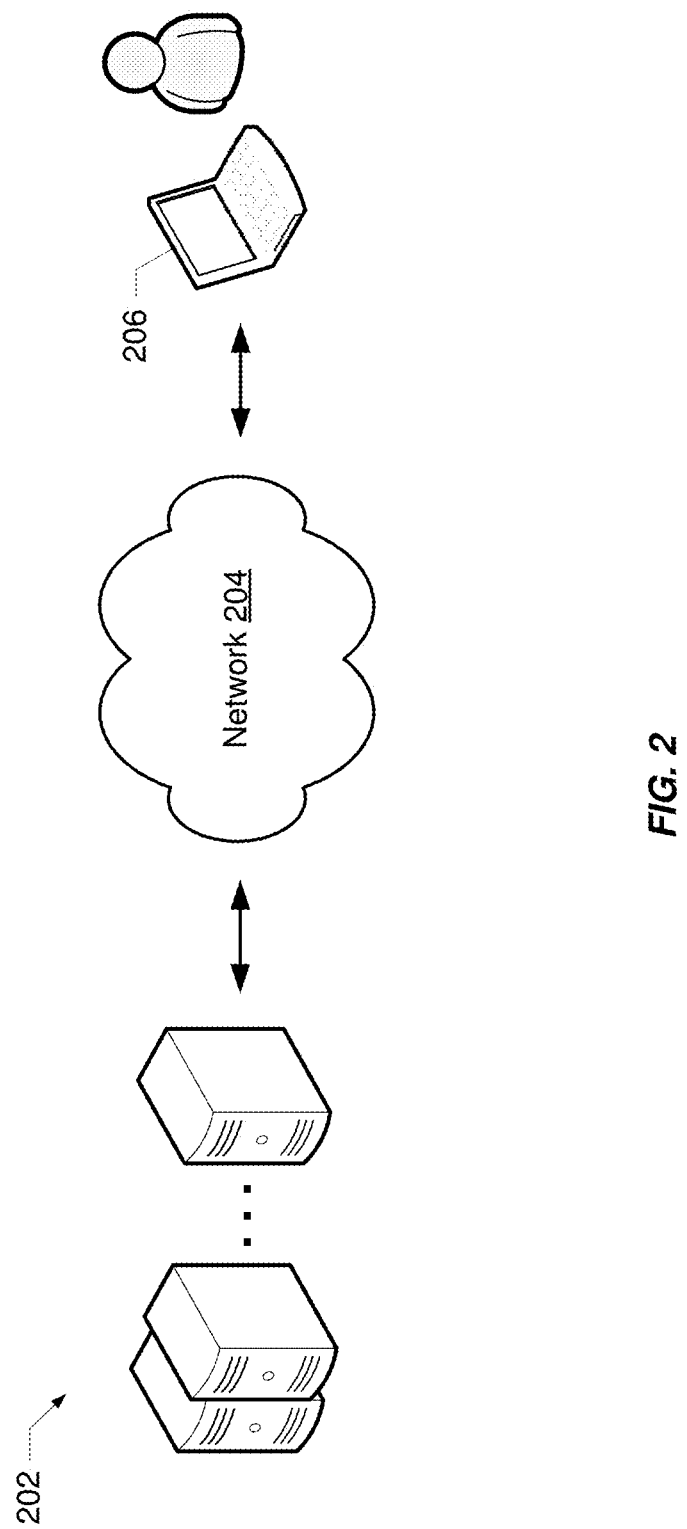
FIG. 2 is a simplified illustration of a computing environment in which implementations enabled by the present disclosure may be practiced.

FIG. 2 illustrates an example of a computing environment in which a content service 202 provides access to media content via a network 204 to a client device 206 in accordance with the techniques described herein. Content service 202 may conform to any of a wide variety of architectures such as, for example, a services platform deployed at one or more co-locations, each implemented with one or more servers. Network 204 represents any subset or combination of a wide variety of network environments including, for example, UDP/IP or TCP/IP-based networks, telecommunications networks, wireless networks, satellite networks, cable networks, public networks, private networks, wide area networks, local area networks, the Internet, the World Wide Web, intranets, extranets, and so on. Client device 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), digital personal assistant devices, smart televisions, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

The various implementations enabled by the present disclosure contemplate logic resident on the client device consuming media content from content service 202, such logic being configured to use metadata provided with the media content to support the GUI functionalities described herein. Such logic might be part of an existing algorithm or module on the client device (e.g., a media player) or implemented to work in conjunction with such an algorithm or module.

It should be noted that implementations are contemplated in which, in addition to facilitating content delivery to client device 206, content service 202 may include logic that facilitates generation, storage, and communication of the metadata employed by client device 206 to support the GUI functionality enabled by the present disclosure. Implementations are also contemplated in which all or some portion of such logic operates remotely from content service 202, and/or may be under the control of an independent entity. From these examples, those of skill in the art will understand the diversity of use cases to which the techniques described herein are applicable.

Figure 3:
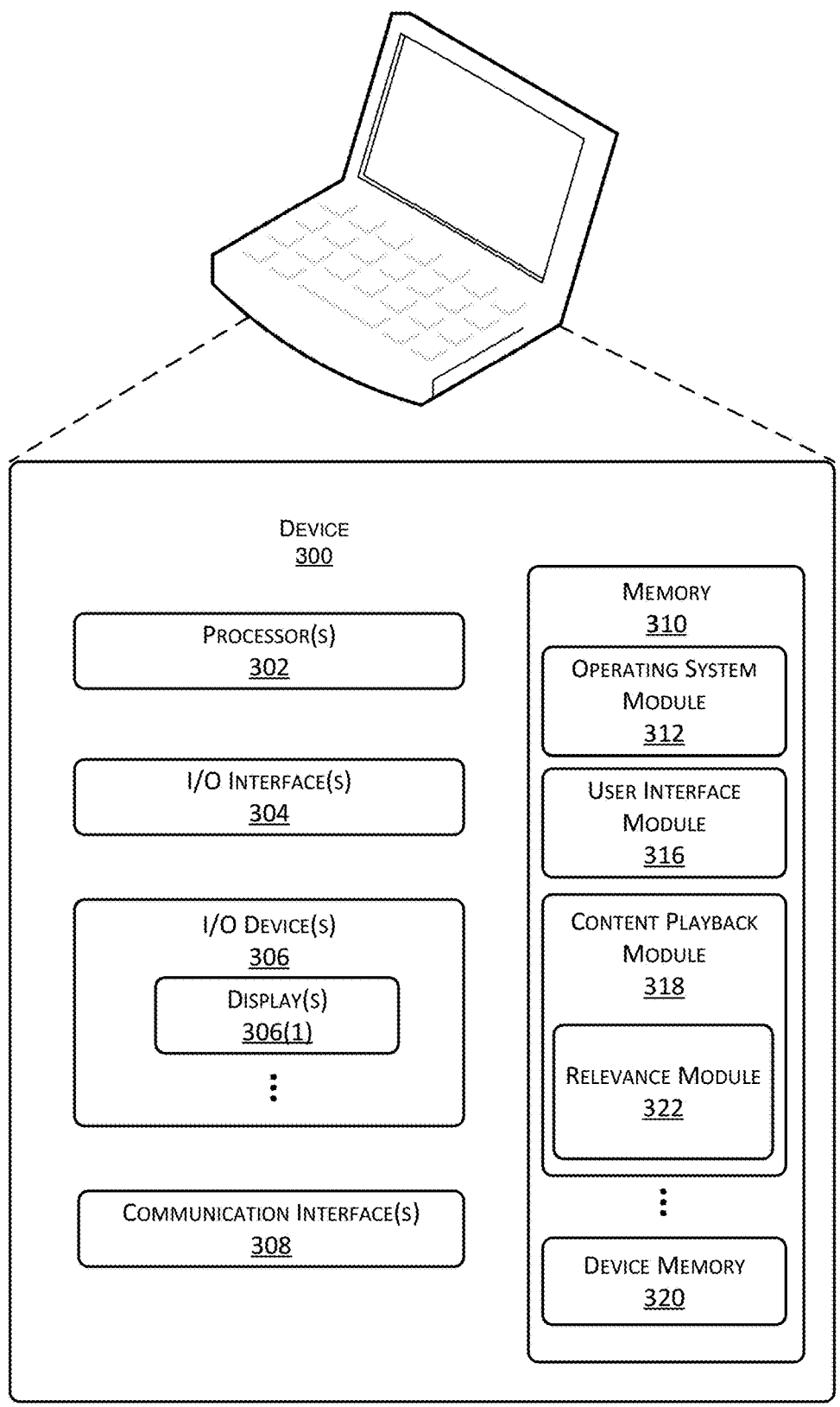
FIG. 3 is a simplified illustration of an example of a client device for use with implementations enabled by the present disclosure.

A block diagram of an example of a client device 300 suitable for use with various implementations is shown in FIG. 3. As mentioned above, it should be understood that device 300 may be any of a wide variety of device types. Device 300 (depicted as a laptop) includes one or more single or multi-core processors 302 configured to execute stored instructions (e.g., in device memory 320). Device 300 may also include one or more input/output (I/O) interface(s) 304 to allow the device to communicate with other devices, e.g., an I2C interface, an SPI bus, a USB, an RS-232 interface, an HDMI interface, etc. I/O interface(s) 304 is coupled to one or more I/O devices 306 which may or may not be integrated with client device 300.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 4G or 5G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content playback module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

Relevance logic (represented by 322 in FIG. 3) used to enable the GUI components and functionalities described herein may be implemented in a variety of ways, e.g., in hardware, software, and/or firmware. As shown, logic 322 may be integrated with content playback module 318. Alternatively, logic 322 may be integrated with another module (e.g., user interface module 316), or logic 322 may be implemented as a separate module. It will also be understood that device 300 of FIG. 3 is merely an example of a device with which various implementations enabled by the present disclosure may be practiced, and that a wide variety of other devices types may also be used. The scope of this disclosure should therefore not be limited by reference to device-specific details.

Implementations enabled by the present disclosure enable the presentation of GUIs in which entities represented in media content are presented in terms of how they relate to the media timeline of the media content. The techniques described herein free the consumer from depending on playback to explore content, instead allowing an asynchronous approach to exploration of the content that leverages the efficiency of the visual cortex of the human brain to get at information of interest.

According to some implementations, entities represented in media content are organized in a multi-time-scale summarization that allows the consumer to zoom into the time period(s) of interest and identify the most interesting things being talked about, visually appearing, or otherwise represented in that time period.

It should be noted that, while the present application describes examples relating to video content, the techniques described herein may be applied to other types of media content including, for example, audio content, text, images (e.g., a slide presentation or photo stream with narration), etc. It should also be noted that while keywords are referenced in the example described herein, other types of entities (e.g., particular speakers or visual objects) may be employed as described herein without departing from the scope of the invention.

Figure 4:
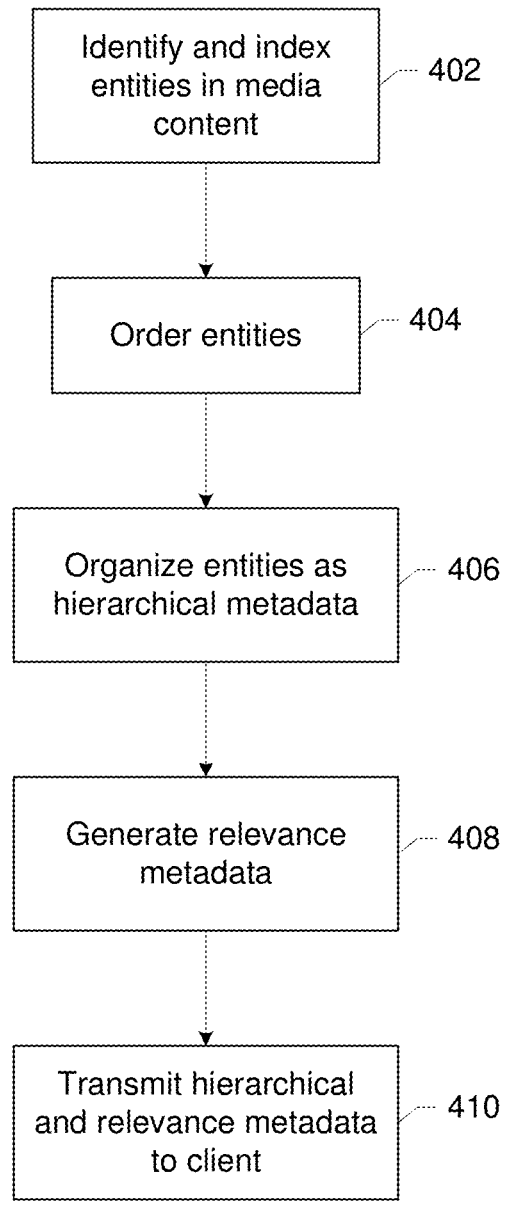
FIG. 4 is a flowchart illustrating a particular implementation enabled by the present disclosure.

A particular class of implementations will now be described with reference to FIGS. 4-7. The flowchart of FIG. 4 illustrates generation of structured metadata for media content that organizes the entities represented in the media content by time.

For a given media content presentation (e.g., video content), entities are identified and indexed relative to the media timeline of the content (402). As mentioned above, entities may include keywords, distinct speakers, or visual objects, among other possibilities. These entities may be identified in a variety of ways. For example, keywords may be extracted from the audio transcript associated with the media content, subtitles, or closed-caption text (e.g. srt file) using tools such as, for example, Amazon Comprehend, Google Cloud Natural Language API, Azure Text Analytics, IBM Watson Natural Language Understanding, etc. If a transcript is not already available for audio track(s) associated with the media content, it may be generated by a closed captioning service or automatically by using any of a variety of speech-to-text transcription tools such as, for example, Amazon Transcribe, Google Speech-to-text, Azure Speech service, IBM Watson Speech to Text, etc.

In another example in which entities correspond to distinct speakers, voice recognition technologies (e.g., Amazon Transcribe Features or Azure Speaker Recognition) may be employed to identify different speakers as distinct from one another (e.g., speaker A and speaker B) and/or to specifically identify individual speakers (e.g., a particular talk show host or celebrity). Distinct speakers may also be identified using facial recognition tools to process image frames or video frames (e.g., Amazon Rekognition, Vision AI from Google, or Microsoft Azure Cognitive Services). Other approaches to speaker separation and/or identification are embodied by the pattern recognition platforms described in U.S. Pat. No. 7,966,274, the entire disclosure of which is incorporated herein by reference for all purposes.

In another example, entities may be identified using image processing tools (e.g., Amazon Rekognition, Vision AI from Google, or Microsoft Azure Cognitive Services) to identify specific types of visual objects present in image frames or video frames. Implementations are also contemplated in which the recognition and presentation of entities in a GUI as enabled by the present disclosure can be extended beyond traditional media presentations. For example, objects can be recognized in the data or signals generated using any of a wide variety of imaging technologies (e.g., radar, lidar, etc.), and presented relative to a corresponding timeline. More generally, any type of time-indexed data in which entities may be represented may benefit from the techniques describe herein.

In some implementations, and as discussed below, entities for a given media presentation may also be identified from a user or network of users, e.g., by input received from a user or users, and/or from user data stored for a user or users.

According to some implementations, the entities are identified for consecutive and non-overlapping portions of the media content. For example, these portions might each be the same duration, e.g., 15 seconds long. Alternatively, these portions might be of different durations, being delineated, for example, by shot or scene boundaries in the content. As yet another alternative, the portions might be semantically determined, e.g., each spoken sentence, a semantically related set of sentences, or uninterrupted speech corresponding to a particular speaker. In other words, for the purpose of identifying entities, the media content may be quantized into chunks that may be either chunks of time or semantic content. Implementations are also contemplated in which the portions of the content may be overlapping.

More generally, any way in which entities represented in media content and their respective positions relative to the media timeline of the content can be identified may be employed to support functionalities enabled by the present disclosure.

The entities identified for each portion of the media content are ordered according to some measurement of salience or relevance (404). According to some implementations, salience or relevance may be determined, at least in part, as a measure of the value of each word as determined by the text extraction tool (e.g., Google cloud language module, Comprehend). The extraction tool might also provide other useful information such as, for example, the entity type (e.g., whether the entity is a person, place, or thing, work of art, etc.), the mention type (e.g., proper name vs. common name), and so on. Such additional information may be employed to augment presentation of the corresponding entities.

More generally, salience can be specified or determined in a variety of ways (e.g., word frequency, uniqueness, relevance, etc.) using any of a variety of tools. The extraction tool can be configured to focus on particular types of keywords, e.g., proper names of humans and organizations. The output of the extraction tool may be used directly to determine the entities for a given portion of the content. Alternatively, the output of the extraction tool may be further processed using additional algorithms or parameters to get a set of entities that suits a particular application. According to a particular implementation, a scoring layer is provided in addition to the salience options of the extraction tool to bias entity scores in a configurable manner that is relevant for the type of information the particular application is intended to capture, e.g., relevant to sports, science, news, etc.

Scoring of identified entities may be evolved over time with machine learning techniques, training a machine learning model using a corpus of text and/or user input. User selection and input of keywords can be tracked over time to drive improvement of the salience/scoring algorithm for particular media content or for a category or class of media content. For example, if there are multiple users viewing a particular video, the entities they select can be captured and used as feedback to modify the scoring algorithm for that video or a larger class of similar videos. This might include adding entities selected by users to be included among the relevant entities for that content.

More generally, back-end learning can be driven by user interaction with the GUI in which time-indexed entities are presented. For example, the more users select specific entities or entity types, those entities or types might be emphasized in future extraction operations. Such feedback can be driven statistically (e.g., as is common in search algorithms). Alternatively, information about the entities being selected (rather than the words themselves) can be used to drive a more optimal scoring algorithm. For example, if users frequently select proper names for a particular video, proper names can be weighted more heavily in the scoring algorithm for that video and other videos like it.

The time-indexed entities are organized as hierarchical metadata (406). According to some implementations, the different levels of the hierarchy relate to different time scales. For example, in one implementation, in addition to the 15-second portions of the media content, the entities are organized according to one-minute, five-minute, ten-minute, and fifteen-minute portions of the content (e.g., as discussed above with reference to FIG. 1).

According to this implementation, each 15-second window has a corresponding set of the top entities in that window ordered by a salience score. The number of keywords for each 15-second window can be a set (configurable) number, variable (e.g., based on a salience or score threshold), or exhaustive (e.g., all keywords that aren't things like articles, conjunctions, etc.). Keyword sets for different time scales (e.g., 1, 5, 10, 15 min) may be generated in different ways depending on the implementation.

According to one implementation, the extraction and scoring can be repeated for windows on each time scale. This might be done using the same 15-second extraction window and aggregating the results. Alternatively, the keyword sets for smaller time scales can be combined to create the sets for larger time scales, e.g., 4 consecutive 15-second window sets to get 1 minute, 20 consecutive 15-second window sets or 5 consecutive 1-minute window sets to get 5 minutes, etc.

In addition, the windows for the higher time scales may be non-overlapping or overlapping. In the latter case, for example, each 1-minute window might overlap with adjacent 1-minute windows by 15, 30, or 45 seconds. When lower time scale sets are combined to get a set for a higher time scale, the entities may be reordered (e.g., based on their salience/scores) with the relevance of repeated entities being reinforced (e.g., the score for a given entity can be increased if it is repeated in the different sets being combined). A limit may be set on the number of entities in the sets for higher time scales. For example, there might be only 12 or 15 keywords allowed for each 1-minute or 5-minute window even if there are more than that in the sets for the underlying 15-second windows. According to a specific implementation, entity sets are determined for 1-minute, 5-minute, 10-minute, and 15-minute time windows every 15 seconds (e.g., multiple sliding windows with step of 15 seconds).

FIG. 5 illustrates an example of a portion of hierarchical metadata in which the entities are organized in entity sets for each window of time of the video at each time scale. As will be discussed, this hierarchical metadata may be used to drive the dynamic keyword list presented on the client device as a function of the slider position and width in relation to the playback bar (e.g., slider 106 and playback bar 104 of FIG. 1). In the depicted example, the entities are only shown for 5, 10, and 15-minute windows for clarity.

A second type of metadata is generated based on the time-indexed entities that represents how each entity maps to the relevance bar (408), e.g., relevance bar 114 of FIG. 1. The example of this relevance metadata shown in FIG. 6 includes a value for each entity for every 15-second window of the media content. The value might be a one or a zero depending on whether the entity is represented in that window. Alternatively, the value may be weighted based for example, by the number of occurrences of the entity in that window and/or the salience score for that entity. As will be discussed, this relevance metadata drives the relevance bar presented on the client device for keywords that have been selected by the user.

The hierarchical and relevance metadata are transmitted to a client media player (410) in connection with, for example, acquisition of a stream or downloading of the corresponding media content. According to a particular implementation, the hierarchical and relevance metadata are packaged as JavaScript Object Notation (JSON) files that are converted to a JavaScript data format for use, for example, by a media player in a web browser.

Figure 7:
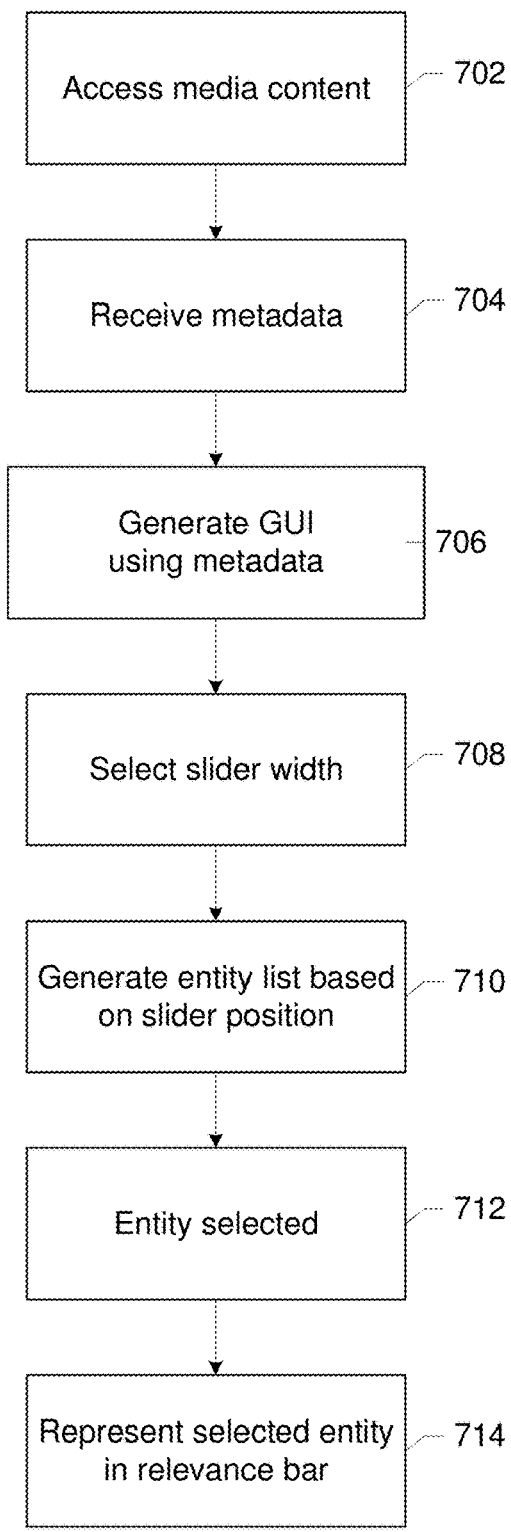
FIG. 7 is a flowchart illustrating a particular implementation enabled by the present disclosure.

The flowchart of FIG. 7 illustrates use of hierarchical and relevance metadata at the client device to support identification of entities of interest and navigation of the media content (or other type of data stream) in a GUI presented on a display associated with the client device. According to a specific implementation, the GUI is implemented in JavaScript using CSS (custom style sheets). The CSS are used to generate the UI elements (buttons, text-entry fields, slider, etc.) and the javascript code governs their functions. As mentioned above, such functionality might be integrated with a media player or provided as an add-on or plug-in to an existing media player.

When a client device accesses media content (702), either by downloading or streaming, the client device also receives the corresponding hierarchical and relevance metadata (704) which it uses to generate components of a GUI (706) to enhance the playback experience of the media content. According to the implementation discussed with reference to FIG. 1, the GUI includes a dynamic keyword list (e.g., 110 of FIG. 1) that includes the top entities for the current range of media content corresponding to the position of a slider (e.g., 106 of FIG. 1) relative to a playback bar (e.g., 104 of FIG. 1) that represents the media timeline of the media content.

The width of the slider may be selected by the user to correspond to one of the time scales represented in the hierarchical metadata (708). The position of the slider relative to the playback bar determines what entities appear in the dynamic keyword list (710). This can be done in a variety of ways and may depend on the overlapping or non-overlapping nature of the keyword sets at different time scales. According to a particular implementation, the entity sets implicated by the slider position correspond to the beginning of the 15-second window immediately before the leading edge of the slider. Alternatively, it can be the 15-second window immediately before the trailing edge of the slider. Or it might depend on the time scale of the slider, e.g., for a 5-minute slider, the beginning of the 5-minute window immediately before the slider. Suitable variations will be appreciated by those of skill in the art. As will be appreciated in view of the foregoing time window quantization (e.g. 15 seconds), the apparent portion of the media content specified by the width and position of the slider relative to the playback bar may not correspond exactly to the range of the media content for which entities are presented in the dynamic keyword list.

According to the implementation described with reference to FIG. 1, the GUI also includes a dynamic relevance bar (e.g., 114 of FIG. 1), the presentation of which is based on the relevance metadata. The relevance metadata may take the form of a vector representing the relevance bar that includes each entity's occurrences to the 15-second windows in the hierarchical metadata. Each 15-second window in which a particular entity appears will correspond to a non-zero value in the vector which may be salience score for that entity or, if there is more than one occurrence of the entity in that window, some combination of the salience scores.

The positions represented in the relevance bar may correspond to the 15-second windows represented in the relevance metadata. Alternatively, the relevance bar may be quantized to some alternate number of distinct locations to which the 15-second windows can be mapped. Before any entities are entered or selected by the user, the relevance bar may be presented as empty, or as a uniform shade or color, representing the fact that all entities are equally relevant.

If the user enters or selects an entity (712), e.g., using PIK component 116 or list 110 of FIG. 1, the corresponding position(s) of any representations of that entity are shown with vertical lines in the relevance bar (714), e.g., a heat map of relevance. If multiple entities are entered or selected, their relevance metadata may be combined (e.g., summed) and normalized for presentation together in the relevance bar. The entering of an entity in the PIK component might also be used to add that entity to the dynamic keyword list or bias the entity scoring algorithm in some way, e.g., to include proper names or that entity type in the list.

Conventional search technologies are typically positively-focused, identifying only instances of search terms the user wants to find. According to a particular implementation, the relevance metadata may be employed to allow a user to identify portions of media content that relate to entities or topics that are not of interest. This allows for the skipping or avoidance of portions of the content. When such entities are entered or selected (e.g., using NIKS component 118 or list 110 of FIG. 1), the corresponding positions are also represented in the relevance bar. This might be done, for example, using gaps or dark lines relative to the original uniform color or shade of the relevance bar. Alternatively, PIKS might be represented with green lines and NIKS with red lines. Suitable alternative will be apparent to those of skill in the art.

Additional functionality may be supported by either or both of the hierarchical and relevance metadata. According to some implementations, a custom playback experience may be supported in which playback of the media content is constrained based on the relevance metadata and one or more entities entered or selected by the user. For example, if a user enters the name of a particular athlete, playback of a sports highlight show could be limited to include only the ranges (e.g., the 15-second windows) of the media content in which that athlete is mentioned. This might be accomplished by creation of a new video including only the relevant portions. Alternatively, playback of non-relevant portions of the content can be skipped. For example, when the relevance of a selected entity (as reflected in the relevance metadata) drops below a threshold, playback could skip ahead to the next relevant portion.

The relevance threshold for such playback could be manipulated to adjust how much of the content should be played back. For example, if a user has only one minute to watch an hour long video, the threshold can be set very high resulting in a shorter playback. On the other hand, if the user has 15 minutes, the threshold can be lowered resulting in longer playback; perhaps providing more of the context around the highly relevant portions. The playback time might be pre-calculated for a given threshold and communicated to the user, e.g., at this threshold it will take 10 minutes for playback. Alternatively, the user might specify how much time she has to watch the video and the threshold can be set accordingly.

As mentioned above, the entities represented in the hierarchical and relevance metadata may correspond to a number of entity types including, for example, distinct speakers in the media content and the portions of the content in which those speakers are speaking. In such an implementation, a dynamic speaker list (similar to the dynamic keyword list), and a speaker bar (similar to the relevance bar) may be presented in a GUI as described above. Similar metadata structures could be created in which the distinct speakers are identified. Such metadata may be represented more efficiently than for keywords in that the 15-second windows in which a particular speaker is speaking can be collapsed into a longer range of time during which that person is speaking. The speaker bar could identify each distinct speaker with a color and the speaker bar would have a multi-colored presentation identifying when the different speakers are speaking.

The distinct speakers could be specifically identified using, for example, speech or facial recognition technologies. On the other hand, some speech-to-text tools actually include speaker identification; not necessarily identifying the speaker by name but distinguishing between different speakers (e.g., A or B). And as will be appreciated, speaker-related metadata can be used to support custom playback as well, i.e., playback can be limited to specific speakers.

According to some implementations, the entities entered or selected by the user as PIKS and NIKS may be employed in a variety of ways beyond identification of their respective positions in the relevance bar. For example, these can be used to weight scores for entities for particular media content or a class of media in a custom fashion. For a given user, this kind of feedback can be used to dynamically evolve a metadata engine or scoring layer for entity extraction that becomes a proxy for the user herself or a class of which that user is a member.

In another example, users can save their entity sets (e.g., PIKS and NIKS) in a manner similar to bookmarks for use with the same or other media content. For example, if a user is researching a particular topic, the user could save a set of PIKS and NIKS for a particular item of media content for use in connection with a later playback of that media content. In addition, a saved set of PIKS and NIKS that turns out to be useful for one item of media content can be re-used with other items of media content relating to the same topic.

In another example, the PIKS and NIKS for a particular user (e.g., a power user, an influential user, a subject matter expert, etc.) can be shared within a population of users. That is, a specific user's feedback for a particular item of media content or a class of media content (e.g., the PIKS and NIKS of that user) could be selected or adopted by another user as a baseline for themselves. For example, a user can select from among experts or authorities in particular subject matter areas, requesting content viewed by a particular expert using that expert's entity sets.

Entity sets for given items of media content, classes of media content, data streams, classes of data streams, particular users, or classes of users can also be used in support of a search functionality to identify other media content having sufficiently similar entity sets. This includes the identification of advertising content that aligns with a given entity set. Moreover, such uses of entity sets are not limited to identifying media content for which entity sets as described herein are available. Rather, any information associated with media content (e.g., conventional metadata associated an item of media content) can be used for comparison with a particular entity set to determine its similarity.

As will be appreciated with reference to the foregoing examples, the data generated by users interacting with media content as enabled by the present disclosure is highly relevant in a number of ways. Not only do implementations enabled by the present disclosure enable a user to interact with media content more efficiently, the feedback from the user as to what is relevant to that user is far more specific and detailed than what is typically acquired in connection with the consumption of media content. That is, most content providers know what users search for, what they watch or listen to, and for how long. By contrast, the techniques enabled by the present disclosure provide ways to acquire feedback relating to very specific interests within the larger context of the media content.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A device, comprising one or more processors and memory configured to:
   present a user interface on a display associated with the device, the user interface including one or more elements configured for specifying portions of media content presented on the display including specifying portions of the media content at multiple time scales, the one or more elements of the user interface including a slider element associated with a representation of a media timeline of the media content;
   adjust a width of the slider element to represent a corresponding one of the time scales;
   identify a first set of entities and a second set of entities using metadata associated with the media content, the metadata including the first and second sets of entities and identifying corresponding ranges of the media content for each entity, the ranges of the media content associated with a first entity corresponding to multiple time scales;
   receive first input representing use of the one or more elements of the user interface to specify a first portion of the media content;
   present the first set of entities on the display, the first set of entities being represented in a first range of the media content corresponding to the first portion of the media content;
   receive second input representing use of the one or more elements of the user interface to specify a second portion of the media content; and
   present the second set of entities on the display, the second set of entities being represented in a second range of the media content corresponding to the second portion of the media content.

2. The device of claim 1, wherein the first set of entities includes one or more keywords included in the first range of the media content, one or more distinct speakers identified in the first range of the media content, or one or more visual objects identified in the first range of the media content.

3. The device of claim 1, wherein the first input represents placement of the slider element relative to the representation of the media timeline of the media content.

4. The device of claim 1, wherein the first portion of the media content corresponds to a first duration of the media content, and wherein the first range of the media content overlaps with the first duration of the media content relative to a media timeline of the media content.

5. The device of claim 1, wherein the one or more processors and memory are configured to:
present a representation of a media timeline of the media content on the display;
receive third input representing a first entity;
identify one or more ranges of the media content in which the first entity is represented; and
update the representation of the media timeline based on the one or more ranges in which the first entity is represented.

6. A device, comprising one or more processors and memory configured to:
present a user interface on a display associated with the device, the user interface including one or more elements configured for specifying portions of media content presented on the display including specifying portions of the media content at multiple time scales, the one or more elements of the user interface including a slider element associated with a representation of a media timeline of the media content;
adjust a width of the slider element to represent a corresponding one of the time scales;
receive first input representing a first entity;
identify one or more first ranges of the media content in which the first entity is represented using metadata associated with the media content, the metadata including a plurality of entities and identifying, for each entity, corresponding ranges of the media content in which the entity is represented, the ranges of the media content associated with the first entity corresponding to multiple time scales; and
update the representation of the media timeline based on the one or more first ranges to reflect one or more occurrences of the first entity relative to the media timeline of the media content.

7. The device of claim 6, wherein the first entity is a keyword included in the one or more first ranges, a distinct speaker identified in the one or more first ranges, or a visual object identified in the one or more first ranges.

8. The device of claim 6, wherein the one or more processors and memory are configured to facilitate playback of the media content on the display such that playback of the one or more first ranges is emphasized.

9. The device of claim 8, wherein the one or more processors are configured to facilitate playback of the media content by skipping one or more second ranges of the media content in which the first entity is not represented.

10. The device of claim 6, wherein the one or more processors and memory are configured to:
receive second input representing a second entity;
identify one or more second ranges of the media content in which the second entity is represented; and
update the representation of the media timeline based on the one or more second ranges to de-emphasize the one or more second ranges.

11. The device of claim 10, wherein the one or more processors are configured to adapt playback of the media content by skipping playback of the one or more second ranges.

12. The device of claim 6, wherein the one or more processors and memory are configured to update the representation of the media timeline by emphasizing an occurrence representation in the representation of the media timeline that corresponds to a plurality of occurrences of the first entity in the corresponding ranges of the media content.

13. The device of claim 6, wherein the one or more processors and memory are configured to save the first input in connection with a user associated with the device.

14. The device of claim 13, wherein the one or more processors and memory are configured to use the saved first input in connection with a subsequent presentation of the media content, or in connection with presentation of different media content of a similar type.

15. The device of claim 13, wherein the one or more processors and memory are configured to share the saved first input for use in connection with presentation of the media content or different media content of a similar type on one or more other devices.

* * * * *